United States Patent
Jeffrey

(12) 
(10) Patent No.: US 6,493,711 B1
(45) Date of Patent: Dec. 10, 2002

(54) WIDE-SPECTRUM INFORMATION SEARCH ENGINE

(75) Inventor: Joel Jeffrey, Wheaton, IL (US)

(73) Assignee: H5 Technologies, Inc., San Francisco, CA (US)

( * ) Notice: Subject to any disclaimer, the term of this patent is extended or adjusted under 35 U.S.C. 154(b) by 0 days.

(21) Appl. No.: 09/305,583

(22) Filed: May 5, 1999

(51) Int. Cl.⁷ .............................................. G06F 17/30

(52) U.S. Cl. ................. 707/5; 704/9; 704/266; 704/243

(58) Field of Search ................. 704/243, 266, 704/9; 455/158.5; 707/515, 501, 104, 102, 532, 100, 1–10; 713/201, 168; 709/238, 207, 206, 223; 705/14, 75; 706/16; 345/115; 370/394

(56) References Cited

U.S. PATENT DOCUMENTS

| | | | |
|---|---|---|---|
| 5,398,300 A | 3/1995 | Levey | 395/22 |
| 5,694,592 A | 12/1997 | Driscoll | 395/603 |
| 5,706,507 A | 1/1998 | Schloss | 395/615 |
| 5,778,362 A | 7/1998 | Deerwester | 707/5 |
| 5,778,364 A | 7/1998 | Nelson | 707/6 |
| 5,781,879 A | 7/1998 | Arnold et al. | 704/9 |
| 5,787,422 A | 7/1998 | Tukey et al. | 707/5 |
| 5,819,224 A * | 10/1998 | Xydeas | 704/266 |
| 5,835,722 A | 11/1998 | Bradshaw et al. | 395/200.55 |
| 5,845,278 A | 12/1998 | Kirsch et al. | 707/3 |
| 5,857,179 A | 1/1999 | Vaithyanathan et al. | |
| 5,873,056 A | 2/1999 | Liddy et al. | 704/9 |
| 5,926,812 A * | 7/1999 | Hilsenrath et al. | 707/5 |
| 6,067,515 A * | 5/2000 | Cong et al. | 704/243 |

FOREIGN PATENT DOCUMENTS

WO    WO 98/58344    12/1998

OTHER PUBLICATIONS

Tao Gu: "An Automated Method of Document Classification and Retrieval by Means of Term Subspaces" Conference Proceedings IEEE Southeastcon '82, Apr. 4–7, 1982, pp. 26–33.

Assorio, Peter G., Classification Space Analysis, Technical Report No. RADC–TDR–64–287 (Oct., 1964).

Jeffrey, Joel, An Information Retrieval System Based on Semantic Measurement, Systems & Information Science Technical Report, Vanderbilt University (1975).

Jeffrey, H. Joel, Expert Document Retrieval Via Semantic Measurement, 2 Expert Systems With Applications 345–352 (1991).

(List continued on next page.)

Primary Examiner—John Breene
Assistant Examiner—Mohammad Ali
(74) Attorney, Agent, or Firm—Fish & Richardson P.C.

(57) ABSTRACT

A method and apparatus are provided for searching for information. The method includes the step of segmenting a judgement matrix into a plurality of information sub-matrices where each submatrix has a plurality of classifications and a plurality of terms relevant to each classification. The method further includes the steps of evaluating a relevance of each term of the plurality of terms with respect to each classification of each information sub-matrix of the information sub-matrices and calculating an information spectrum for each of a plurality of documents based upon at least some of the plurality of terms. The method further includes the steps of receiving a search request, calculating an information spectrum of the search request based upon at least some of the plurality of terms and identifying at least some documents of the plurality of documents as relevant to the request based upon a comparison of the calculated information spectrums.

28 Claims, 2 Drawing Sheets

OTHER PUBLICATIONS

Jeffrey, H. Joel, Judgment–Simulation Vector Spaces, Ch. 13, Advances in Computer Methods for Systematic Biology: Artificial Intelligence, Databases, ComputerVision, ed. Renaud Fortuner (Baltimore: Johns Hopkins University Press, 1993). pp. 214–226.

Johannes, James Donald, Automatic Thyroid diagnosis Via Simulation of Physician Judgment, Ph.D. Dissertation, Vanderbilt University (Aug., 1977).

Kurtz, M.J., et al., Intelligent Text Retrieval in the NASA Astrophysics Data System, Center for Astrophysics Preprint Series No. 3536 (Harvard–Smithsonian Center for Astrophysics [no detail]).

Ossorio, Peter G. Attribute Space Development and Evaluation, Technical Report No. RADC–TR–67–640 (Jan., 1968).

Ossorio, Peter G., Classification Space: A Multivariant Procedure for Automatic Document Indexing and Retrieval, 1 Multivariate Behavioral Research 479–524 (Oct. 1966).

James D. Johannes, Automatic Thyroid Diagnosis VIA Simulation of Physician Judgement, Aug., 1977, i–viii, 1–156.*

* cited by examiner

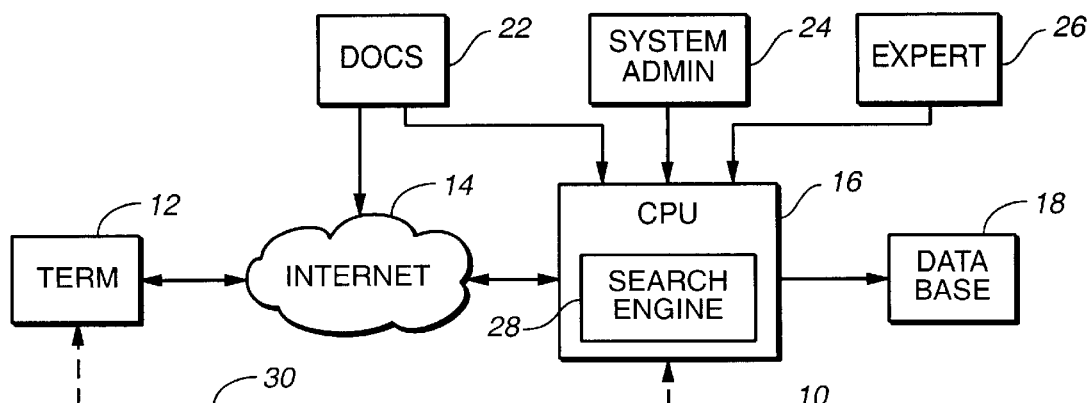
FIG._1
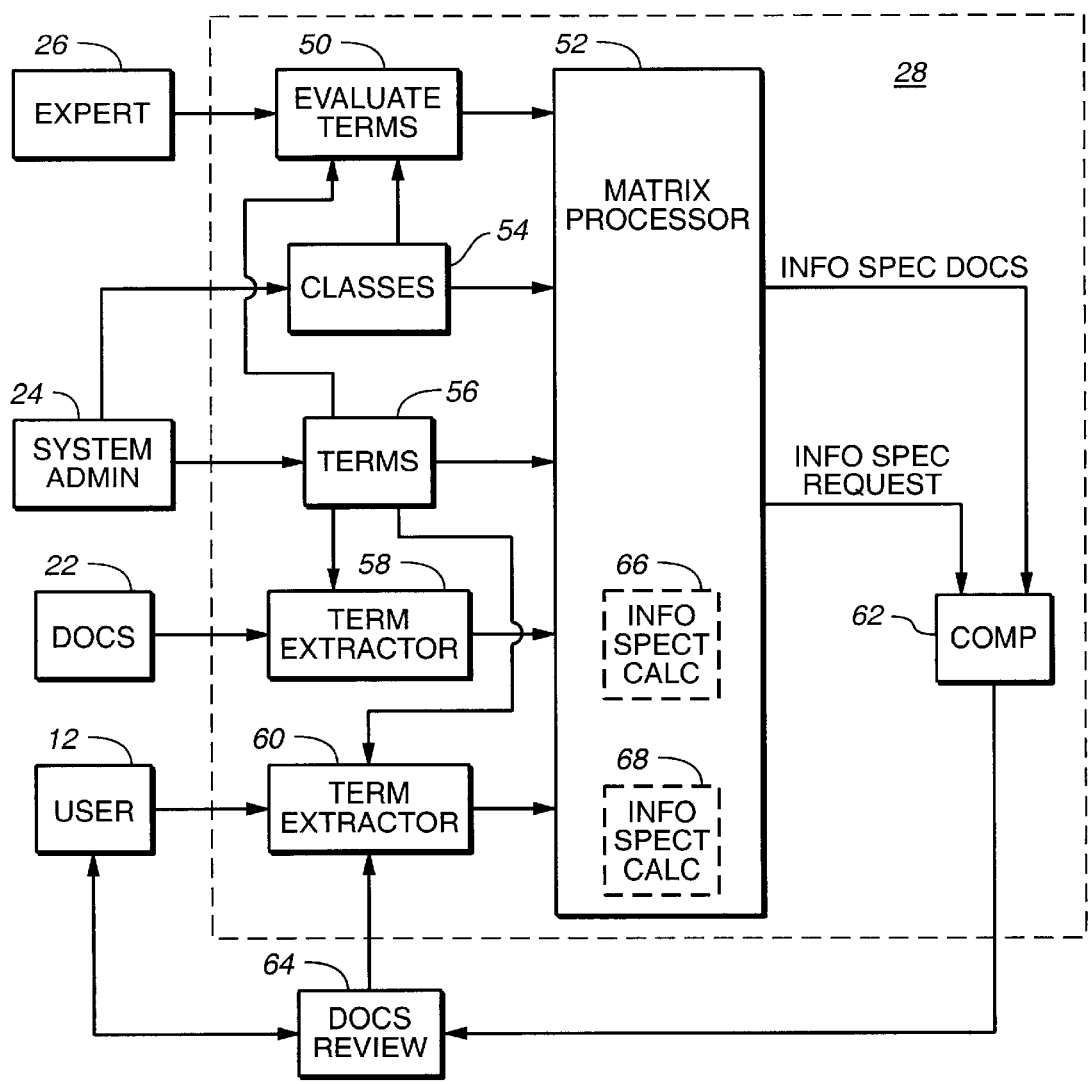
FIG._2

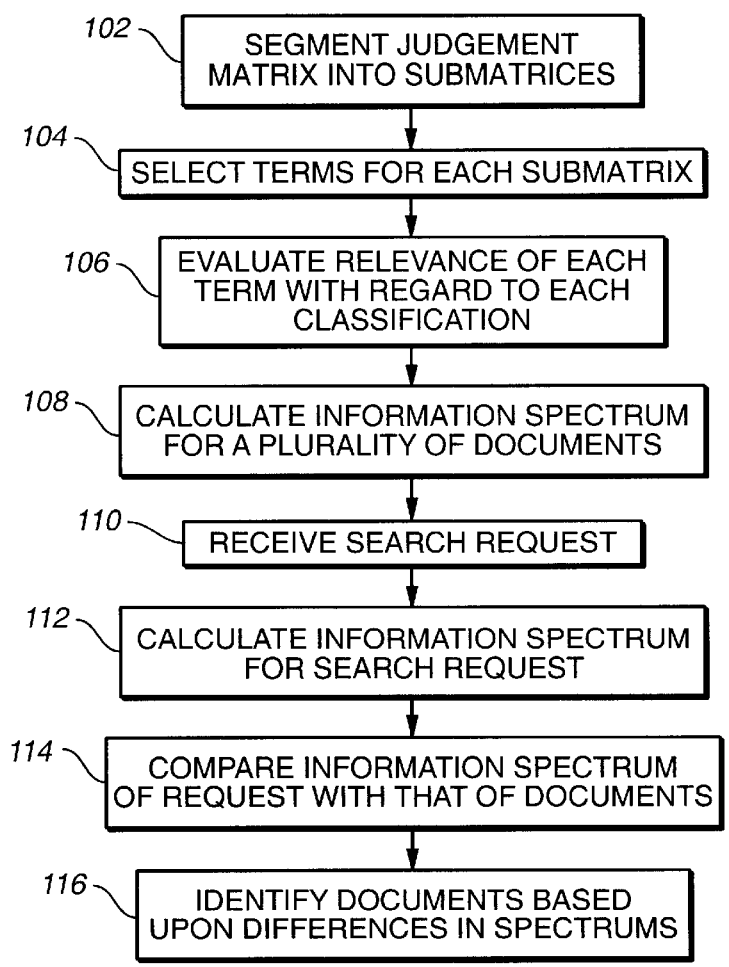
FIG._3
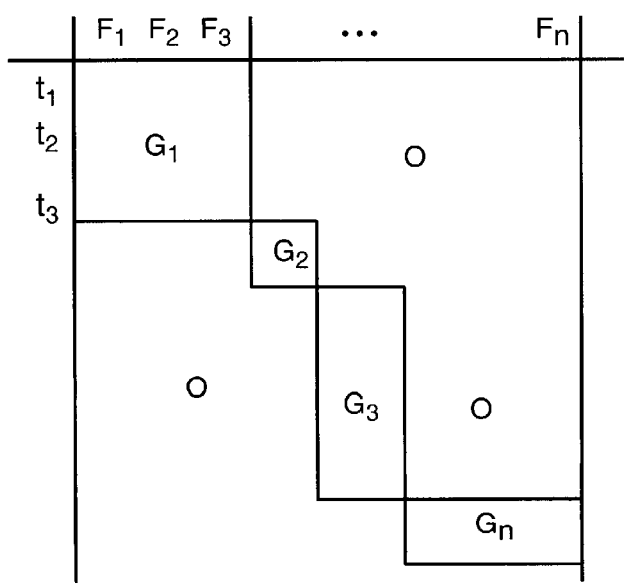
FIG._4

WIDE-SPECTRUM INFORMATION SEARCH ENGINE

FIELD OF THE INVENTION

The field of the invention relates to document retrieval and more particularly to search engines operating within the context of a database.

BACKGROUND OF THE INVENTION

Automated methods of searching databases are generally known. For example P.G. Ossorio developed a technique for automatically measuring the subject matter relevance of documents (Ossorio, 1964, 1966, 1968, 1969). The Ossorio technique produced a quantitative measure of the relevance of the text with regard to each of a set of distinct subject matter fields. These numbers provided by the quantitative measure are the profile or information spectrum of the text. H. J. Jeffrey produced a working automatic document retrieval system using Ossorio's technique (Jeffrey, 1975, 1991). The work by Ossorio and Jeffrey showed that the technique can be used to calculate the information spectra of documents, and of requests for information, and that the spectra can be effective in retrieving documents.

However, Ossorios technique was designed to solve a particular kind of document retrieval problem (i.e., fully automatic retrieval with complete cross-indexing). As a result the technique has certain characteristics that make it unusable for information retrieval in cases in which there is a very wide range of subject matter fields, such as the Internet.

SUMMARY

A method and apparatus are provided for searching for information. The method includes the step of segmenting a judgement matrix into a plurality of information sub-matrices where each submatrix has a plurality of classifications and a plurality of terms relevant to each classification. The method further includes the steps of evaluating a relevance of each term of the plurality of terms with respect to each classification of each information sub-matrix of the information sub-matrices and calculating an information spectrum for each of a plurality of documents based upon at least some of the plurality of terms. The method further includes the steps of receiving a search request, calculating an information spectrum of the search request based upon at least some of the plurality of terms and identifying at least some documents of the plurality of documents as relevant to the request based upon a comparison of the calculated information spectrums.

BRIEF DESCRIPTION OF THE DRAWINGS

FIG. 1 is a block diagram of a search system in accordance with an illustrated embodiment of the invention;

FIG. 2 is a detailed block diagram of the system of FIG. 1;

FIG. 3 is a flow chart of the system of FIG. 1; and

FIG. 4 is a segmented judgment matrix used by the system of FIG. 1.

DETAILED DESCRIPTION OF AN ILLUSTRATED EMBODIMENT

The present invention is a information spectrum measurement engine (also referred to herein as a "wide spectrum measurement search engine") that extends prior art profiling technique to very wide ranges of subject matter, such as exhibited by the Internet, general libraries, and other broad-coverage information collections.

The primary limitation of prior art techniques is in the number of subject matter fields and the number of terms. The original techniques were based on producing a numerical matrix representing the relevance of each of a set of terms in each of a set of subject matter fields. Given S subject matter fields and T terms, each of the S×T numerical ratings must be made by a qualified practitioner in the subject matter field. The profile of a document is calculated automatically, but each item of each term profile must be produced manually; none are automatically calculated. It is an important feature of the technique that every term is numerically rated with respect to each subject matter field; each term has a manually-supplied complete information spectrum.

The current invention is distinguished from the original techniques (e.g., by Ossorio) in three ways. First, the matrix of judgment ratings of the illustrated embodiment is segmented into submatrices. Within each submatrix, a portion of the ratings are done manually, but the remainder of the martrix entries are automatically set to zero, indicating no known relevance. The information spectrum of each document is calculated from the resulting partial term spectra.

Second, the spectra of the terms may be augmented by Bayesian probabilities which use the spectra of the documents to calculate the relevance of those terms whose ratings were previously set to zero for each field. Known document relevance to each field is the necessary attribute for calculating Bayesian probability; the calculated document spectra provide this attribute.

Third, sub-engines may be used to "zoom in" on a subject matter, calculating the spectrum within a field. For example, a document with the terms "muon" and "Higgs boson" is measured as definitely relevant to the field of physics. A sub-engine for physics may be used to measure the information spectrum of the document relativized to physics. Sub-engines can themselves have sub-engines, providing zoom capability to as fine-grained a level as there are recognized subject matter fields.

FIG. 1 is a block diagram of a searching system 10, generally in accordance with an illustrated embodiment of the invention. As may be seen from FIG. 1, a central processing unit (CPU) 16 (and included search engine 28) may receive information and commands from any number of sources.

FIG. 2 is a block diagram which shows processing blocks that may operate from within the search engine 28. FIG. 3 depicts processing steps used by the engine 28 of FIG. 2. Reference shall be made to FIGS. 2 and 3 as appropriate to an understanding of the invention.

Documents may be received from a document source 22 and processed directly, or stored in a database 18. Alternatively, the CPU 16 may recover documents through the Internet from other locations (e.g., other databases) and process the documents directly or, again, store them in the database 18.

It should be noted at this point that only an information spectrum of a document need be stored in the database 18 for searching purposes. The requirement that the database only store an information spectrum of a document significantly reduces the storage requirements of the database 18. For recovery purposes, a hyperlink may be stored in the database 18 along with the information spectrum which, in turn, may lead a user to a database containing the original document.

A system administrator 24 may enter information classifications or terms relevant to classifications. An expert in one or more classifications may evaluate terms relative to any classifications entered by the system administrator 24.

Alternatively, the CPU 16 may receive search requests from a user operating through a local or remotely located terminal (12) (the user and terminal will hereinafter together be referred to as "user 12"). The user 12 may access the CPU 12 from a remote location through the Internet 14 or locally through a direct connection 30.

Turning now to operation of the CPU 16, an explanation will be provided of the steps used by the search engine 28 in accomplishing the improved search method. While the steps used will be described with some generality, it should be understood that the steps described are embodied in the programming steps practiced by the CPU 16.

As a first step, a method of constructing a specific type of judgment matrix will be discussed. Following the discussion of the construction of the judgement matrix, is a discussion of how the judgement matrix is used.

The wide spectrum information measurement search engine is an advance of prior techniques in two aspects. First, the necessity of manually producing an entire judgment rating matrix is eliminated by segmenting the judgment matrix. Second, sorting of the results is eliminated. Each of these aspects will be discussed in more detail below.

In general, a judgment matrix (FIG. 4) is made up of a number of rows (with a term $t_a$ associated with each row) and a number of columns (with a classification $F_b$ associated with each column). The classifications refer to subject matter classifications. The terms are words that may be used to describe various aspects of each classification.

Under previously used methods, a set of subject matter fields were selected for creation of the judgment matrix. Any set of fields was permissible, so long as the set was inclusive of the entire information spectrum. No provision was made for overlap of fields or for the effects of any possible relationships between the fields.

For each field of the prior method, a set of documents were selected. The documents are selected by a competent person as being clearly within that field.

A set of terms were selected for each of the terms of the prior method. The selected terms are words and phrases, taken from the documents for that field that are recognizable to persons competent to make the judgment as being at least tangentially or vaguely related to that field.

Putting the subject matter fields as column headings and the terms as row labels, one has an empty table. From a set of competent human judges, ratings are collected of the degree to which each term is relevant to each field. These ratings of the prior method differ from the use of more customary subject field codes or topic tags in two ways. First, they are not simply a "checking off" that a term is part of a field. The degree of relevance, or importance, of the term is part of the rating.

Second, the rating is numerical. The judges use the following scale in making ratings. If the term is irrelevant, the rating is zero. If the term is tangentially or vaguely related, the rating may be one or two. If the term is peripherally relevant, the rating may be three or four. If the term is definitely relevant and something clearly within the field, the rating may be five or six. Finally, if the term is a highly significant concept within the field, the rating may be seven or eight. In each category, the higher number is used to indicate greater relevance or significance.

Relevance is quantified in a pragmatically useful way; the non-binary nature of relevance is represented and used; and more importantly the ratings are not statistical in nature. There is no relationship, in general, between the importance of the concept represented by a term and the statistics of its occurrence in a corpus of text. Schroedinger's equation, for example, is a central and crucial concept in quantum mechanics, but a text or article on quantum mechanics may have few or no actual instances of the term "Schroedinger's equation." Just as, in information theory, the information value of a signal cannot be determined from the characteristics of the signal, but can only be found from the context (specifically, the possible values of the signal), relevance of a term to a field refers to the place the concept has in the practices that comprise that subject matter field, that is, to how the concept is used in the field. The fundamental advance of prior methods was to devise a technique for representing, in computer-processable form, information about terms that is not derivable by any statistical, mathematical, or algorithmic process. As we shall see, statistical and other formal methods may be used to augment a set of term relevance ratings to provide an initial set, but that initial set is not statistical. This has significant implication for the novelty of the new technique of embodiments illustrated below.

The matrix of judgment values may in general have considerable overlap and redundant information, because the fields themselves were originally selected with no thought to their relationships. If we were to view the fields, the columns of the matrix, as a mathematical basis for each of the terms' vectors, the mathematical statement of this situation is that the basis is not minimal and is not orthogonal. Overlapping and redundant fields seriously harm the use of the vectors, as will become apparent shortly. To use the vectors, an orthogonal basis for the set of vectors is highly desirable. This basis is found by factor-analyzing the judgment data matrix. If there is prior reason to know that the original dimensions are conceptually independent, this step may be skipped.

The measurable common factors, together with the unique factors, resulting from the factor analysis provide the basis of the vector space. Each common factor is divided into two factors: those with significant loadings (over 0.7), and with significant negative loading (less than –0.7). If the rating step described above is skipped, this is equivalent to counting each original field as a unique factor, with loading 1.0.

The information profile, or spectrum, of each term may be calculated by averaging the ratings of the term on the fields that make up each basis vector, weighting the average by the cube of the loading of the field on the vector. For example, if basis vector 1 is comprised of fields 1, 3, and 17, with loadings of 0.8, 0.9 and 0.85, respectively, and term is rated 4 in field 1, 6 in field 3 and 8 in field 17, then component 1 of term t's profile is given by:

$$(0.8^3*4+0.9^3*6+0.85^3*8)/(0.8^3+0.9^3+0.85^3).$$

The information spectrum of each document is now calculated by combining the term profiles of all terms found in the document. In calculating the document spectrum, due to the orthogonality of the basis vectors, only the $1^{st}$ component of the term spectra contribute to the $1^{st}$ component of the document spectrum, only the $2^{nd}$ components contribute to the $2^{nd}$ component, and so forth. The most recent work (Jeffrey, 1991) used a log-average of the component values.

Retrieval is accomplished by scanning a user request for known terms, calculating the spectrum of the profile of the request (e.g., as for a document), and calculating distance from the request spectrum to each document spectrum. Any distance measure may be used; Ossorio and Jeffrey used Euclidean distance; Jeffrey also used the Manhatten distance. Experiments by Jeffrey with other distance measuring techniques demonstrates that change of distance measurement techniques does not result in a significant change in the procedure. Since the spectra represent subject matter content, spectra that are similar numerically have similar subject matter content. Retrieval of documents in the past has proceeded by sorting all documents in order of closeness of spectra to the request spectra, and returning documents to the user in order of closest first.

The technique is described herein in terms of a search for documents of a predetermined subject matter. However, Ossorio showed that the overall technique can be used to measure the spectrum of several kinds of information, such as attributes, categories, significant dimension of variation and means-end (Ossorio, 1966, 1969). In a medical context, J. D. Johannes showed that the spectrum can be the diagnostic indications of a set of patient signs and symptoms (Johannes, 1974).

Difficulties arise in attempting to extend the basic techniques of the prior art to situations in which there is a large number of subject matter fields (or categories, types of content, etc.). The most serious of these is the amount of time necessary to complete a rating matrix. Ossorio constructed measurement systems from 60 subject matter fields and 1548 terms, a total of approximately 93,000 individual ratings. In Jeffrey's document retrieval system 62 subject matter fields and subfields were selected from the area of Computer Science. To describe the subject matter, 800 terms were used which required approximately 48,000 ratings. In that work, it was found that approximately 1,000 ratings can be done per hour. A 20-field, 10,000-term matrix could thus be constructed in about 200 hours.

However, in the case of the Internet, for example, a very conservative estimate of the number of subject matter fields necessary to cover all subject matter on the Internet would be at least 1,000, and would require at least 100,000 terms. This rating matrix would take 100,000 hours, or 50 person-years, to construct.

The second difficulty or prior methods arises in retrieving individual documents from a very large collection of documents. The distance from each document to the request must be calculated, either by calculating each document distance individually or by applying an automatic clustering technique to the text of the documents or to their spectra. Calculating this distance, for 50-component spectra, takes approximately 130 seconds for 1,000,000 documents on a PC with a 300 MHz processor. However, the basic retrieval technique requires sorting these distances, to retrieve the most similar document first. The fastest possible sorting algorithm requires time proportional to N*log(N), where N is the number of items to be sorted. As a result, sorting 1,000,000 documents requires 3,000 times as long as sorting 1,000 documents (not 1,000 times). (By way of comparison, the Windows DOS sort command requires 1 min 15 seconds to sort 900,000 numbers, on a 300 MHz PC with 64 megabytes of RAM. Sorting 10,000,000 would therefore take 10*4=40 times as long.) These two difficulties make document retrieval by information spectrum impractical for very large data bases, such as the Internet.

The wide-spectrum information measurement engine 10 of FIG. 1 is a significant advance over prior systems in two respects. First, the necessity of manually producing an entire judgment rating matrix is eliminated, by segmenting the judgments. Second, the need for sorting is eliminated.

The judgment matrix of the illustrated embodiment of FIG. 4 is developed as follows. First, the columns of the matrix (e.g., the subject matter fields, when the matrix represents subject matter relevance) may be segmented 102 into groups $G_1, G_2 \ldots G_n$. Each group may be divided to include a number of classifications $F_1$ to $F_a$. For each group $G_i$, a set of terms $t_1$ to $t_b$ are selected 104 for each of the fields. For each field, a set of documents clearly within that field may be selected by a competent person in that field. A set of terms are selected for each field. These terms are words and phrases, taken from the documents for that field which are recognizable by persons competent to make the judgment as being tangentially or vaguely related to the field.

For each group $G_i$, and the terms for that group, ratings are obtained for each of the terms with respect to each of the fields. The subject matter fields are placed into the segmented judgment matrix of FIG. 4 as column headings and the terms as row labels. From a set of competent human judges, ratings are gathered and evaluated 106 of the degree to which each term is relevant to each field. The judges may use the following scale in making ratings: if the term is irrelevant, the rating is zero; if the term is tangentially or vaguely related, the rating may be one or two; if the term is peripherally relevant, the rating may be three or four; if the term is definitely relevant and something clearly within the field, the rating may be five or six; and if the term is a highly significant concept within the field, the rating may be seven or eight. In each category, the higher number is used to indicate greater relevance or significance.

However, each term is rated only with respect to each of the fields which make up the group. All other matrix entries are set to zero. The result of this procedure is a matrix of entries as illustrated by FIG. 4.

Under the illustrated embodiment, the procedure segments 102 the overall ratings matrix into a disjoint set of smaller submatrices such that every term is rated with respect to the fields of one submatrix. Further, each submatrix has a set of terms which represents its content.

As with prior methods, the matrix of judgment values selected may in general have considerable overlap and redundant information, because the fields themselves were originally selected with no thought to their relationships. If the columns of the matrix are to provide a mathematical basis for each of the terms' vectors, the mathematical statement of this situation should be minimal and orthogonal. To use the vectors, an orthogonal basis for the set of vectors is desirable. This basis is found by factor-analyzing the judgment data matrix.

Factor analysis re-distributes the original evaluation data provided by the judges. The original columns (i.e., classifications) (now called subject matter fields) are grouped together into common factors. The number which relates the original fields to the groups is called the factor loading. The output of the factor analysis is a set of factor loadings. The set of factor loadings represent the angle between the original evaluation data and the factor analyzed evaluation data. Factor analysis may be accomplished using any of a number of commonly available software packages provided for such purpose.

The information spectrum for each term of the entire matrix may now evaluated 106. The information profile, or spectrum, of each term is calculated, as above, by averaging the ratings of the term on the fields that make up each basis vector, weighting the average by the cube of the loading of the field on the vector. However, the spectrum components for a term not rated with respect to some field $F_k$ is automatically zero, since that term's rating on the field was automatically set to zero.

The information of each document in the collection of documents is now calculated 108 in a first information spectrum calculator 66, using the term spectrum discussed above. The collection is now ready for use, in any application in which it is useful to have the information spectrum, such as for retrieval in response to a user request.

Retrieval is accomplished as follows. A received request 110 is scanned for known terms and its information spectrum calculated 112 in a second information spectrum calculator 68. An information spectrum of the request and documents may then be compared 114 in a comparator 62. Documents may be identified 116 and retrieved based upon Euclidean distance of the document spectrum from the requested spectrum.

Each segment $G_1$–$G_n$ is, in effect, a basic information spectrum measurement engine. Ossorio's results, confirmed by Jeffrey, showed that the structure of the basic measurement engine is stable if there are a minimum of approximately 6 term per field. This allows the user to calculate the effectiveness of the segmentation process. If the user is constructing a wide spectrum information measurement engine on, for example, 1000 fields, using ratio of 6 terms per field, the user has an overall matrix of 1,000 field by 6,000 terms or 6,000,000 entries. At 1,000 ratings per hour, this matrix would require 6,000 hours (three person years of manual effort). However, by segmenting the matrix into groups of 50 fields, each segment would require 50 fields× 300 terms, or 1,500 ratings, which requires 1,5 hours of effort. To cover the 1,000 fields requires 20 such segments, resulting in a total effort of 30 person-hours, or 5% of the effort to manually fill out the entire matrix.

This reduction in effort is not without cost. It was noted in the discussion of the basic technique that the basic technique was devised in order to produce fully automatic and completely cross-indexed document retrieval. By setting large portions of the ratings matrix to zero, some cross-indexing information is lost. The value of this cross-indexing in retrieving all relevant documents is restored by the person doing the search. The searcher may need to use the retrieved documents to continue the search, by having the measurement engine based retrieval system search a second time for documents similar in spectrum to one or more documents already retrieved. The user may receive documents on his terminal 12 downloaded from a document reviewer 64 and select a document. The document selected is treated like a request (i.e., terms are identified in a term extractor 60), and other document with similar spectra are retrieved. By "pasting" portion of several documents into a request (using the WORD facilities of the terminal 12), requests of arbitrary size and scope can be composed.

To illustrate this point, consider a spectrum measurement engine covering fields of history and of medicine. A figure of great importance in English history is King Henry VIII. Henry VIII is known to have had syphilis. A searcher wants to find documents that discuss Henry's medical condition. She requests documents on King Henry VIII. This name is rated as highly relevant (7 or 8) to English history, relevant (5 or 6) to the field of history in general, and zero (by default) with respect to the field of medicine in general and the subfield of sexually transmitted disease (STD). Therefore the searcher's request, containing only terms relevant to English history, will have a measured spectrum high on English history and very low or zero on medicine. Documents with similar spectra will be returned. Since "Henry VIII" was not rated with respect to medical fields, documents with high medical and STD content will not be returned. However, since documents on Henry VIII will have similar spectra, they will be returned to the searcher, and some of these will mention syphilis. The searcher selects one of these documents, or a portion of it (e.g., one with a greater medical content) and requests documents similar to that one. This second retrieval produces documents with much higher medical and STD content and much less history content.

While six terms per field may suffice to construct a basic spectrum measurement engine, or a segment of one, calculating the information spectra of a large collection of documents in a field requires a much larger vocabulary, for document spectra are calculated solely on the basis of the spectra of terms found in documents. While 300 terms will suffice to construct a basic measurement engine for 50 fields, several thousand terms may be needed to cover the usage in documents. In Ossorio's original work, he found over 1,500 terms in a corpus of 36 documents. For 50 fields, 1,000 terms can be manually rated, as was done in Jeffrey's work, but 10,000 terms would require 500 hours.

Once a basic information spectrum measurement engine is complete, the following procedure can be used to calculate the term spectra for additional terms. First, the document profiles of the document collection is calculated using the initial segmented wide-spectrum information measurement engine described above.

For each new term, the following steps may be followed. For each orthogonal dimension, d, count the number of occurrences of the term in all documents in the collection. Count the number of occurrences of the term in all documents considered definitely relevant to dimension d. (Typically this will be defined by having a rating of greater than or equal to 5.0 on dimension d.) However, a lower threshold can be used if the engine designer desires to make the engine more likely to rate a document relevant to dimension d on the basis of the occurrence of terms less connected to dimension d.

The probability that a document with this term had dimension d content is given by the Bayesian probability formula as follows:

$$P(d|\text{term } t) = p(d \& \text{ term } t)/p(\text{term } t)$$

The probability p(d & term t) and p(term t) are given as follows. First p(d & term t) are made equal to the number of documents with term t that are relevant to d divided by the number of documents in the collection. Second, p(term t) is made equal to the number of documents with term t divided by the number of documents in the collection.

For example, given a collection of 10,000 documents, with 1,000 relevant to physics (i.e., rated $\geq 5.0$ on the dimension of physics), the term "muon" is found in 100 physics documents and 20 non-physics documents.

$$P(\text{physics \& } muon) = 100/10,000 = 0.01$$

$$P(muon) = (100+20)/10,000 = 0.012.$$

Therefore, $$P(muon|physics) = 0.01/0.012 = 0.83.$$

Since the spectra are normalized at 8.0, (8.0=highest degree of relevance), this probability is multiplied by 8, to yield a calculated (not human supplied) relevance of 6.6.

When a term is found in a small number of documents, this procedure is not reliable, due to small sample size. Variants of the process are: 1) do not calculate a relevance value for a term appearing in less than a minimal number of documents relevant to dimension d, or (2) set a heuristically determined value of 1.0 to 3.0 for a calculated relevance in this case.

In Ossorio's original work (1964), he noted the need for a way to "zoom in" on a portion of a document's information spectrum. The system 10 provides that capability.

Suppose that field F (or, in the case of an engine measuring another type of content such as an attribute-measurement engine, component F of the measured content spectrum) is represented in a wide-spectrum engine, and that no subfields of F are represented in the wide-spectrum engine. Further suppose that a secondary engine covering the subfields of field F has been constructed, either by the basic spectrum measurement technique or the wide-spectrum technique described above. For example, F could be Computer Science and the subengine, the Computer Science subfield engine devised by Jeffrey. A document and request are both determined to have wide spectra with significant content of type F (i. e., over a threshold value, typically 5.0). If the difference in values on component F is "w", w is the contribution of the difference in content F to the distance between the document and request wide spectra. If both document and request had no other nonzero components in their spectra, the Euclidean distance between them would be w. However, both document and request are now measured by the subengine for field F, and it is found that the Euclidean distance of their spectra within field F is f. If the engine for field F has N orthogonal components, and each spectrum has a value of at least 5 on at least 1 component of F, the maximum distance $D_{max}$ between the 2 spectra is determined as follows:

$$D_{max}=sqrt((N-1)*8^2+(8-5)^2)=sqrt((N-1)*64+9).$$

The difference w between the document and request spectra on field F is replaced with a value equal to (the distance between document and request in $F*w)/D_{max}$.

Thus, if the document and request are as far apart as possible within F, the difference in their wide spectra used to compute their retrieval distance remains almost the same. However, if they are quite close within F, their wide spectra retrieval distance is correspondingly reduced. If F is the only significant content for the document and request, the document is thus retrieved much earlier in the sequence of retrieved documents as is appropriate.

In general, the zoom-in procedure is recursive, as subfields of F (or sub-types of content type F) may themselves have sub-subfields and these may be represented by sub-subfield spectrum measurement engines. The recursion is limited only by the particular subengines implemented.

The subject of elimination of sorting will be discussed next. Retrieval with the basic spectrum measurement engine depends on sorting the documents by their distance from the request. Suppose three documents are found whose spectra are at distances 3.0, 5.0 and 3.5 from the request spectrum. If retrieval is to be in order of most-relevant first, the documents must be sorted in order of distance that their spectra are from the request spectrum. However, the same is not true if the distances are 3.0, 3.02 and 3.01. The fundamental concept of relevance is that of practical use by a person. The concept is a pragmatic (not numerical) one. Accordingly, although these distance are numerically out of order, the differences in distance are not significant. This is due to the fact that the original ratings, upon which all numerical calculations are based, are integers from 0 to 8. Using standard scientific rules of precision, differences of 0.1 are significant, but differences of less than 0.1 are not. If effect, the space of all information spectra derived from the basis rating procedure is quantized. Therefore the current invention alters the basic measurement engine retrieval procedure as follows.

First, all documents at distance d are placed in a "bucket" whose number is the integer part of d/0.1. Thus, documents at distance 0.0 to 0.1 are placed in bucket 1, those from 0.1 to 0.2 in bucket 2, etc. The maximum number of buckets is given by the maximum distance two spectra can have, if they have N components: 8*sqrt(N).

Second, all documents in bucket 1 are retrieved for the user, then all in bucket 2, etc. While documents in the same bucket may have numerically different distances, the distances are not meaningful, and therefore retrieval in order of relevance is not violated.

The effect of this procedure is to eliminate the sorting step from retrieval. As noted above, this is a very significant savings in time for retrieval, of particular importance for searching large document collections, such as the Internet. The novelty of this advance is the recognition that the information spectrum space is quantized. This is what allows the bucket technique without degradation in retrieval performance.

The information-spectrum measurement engine 10 differs from prior techniques in that it measures the subject matter relevance (or other type of content) of text, quantitatively. The spectrum is a normalized numerical measure of the amount of each type of content the text contains. This distinguishes it from all methods, processes, and systems that perform calculations to associate a set of subject matter fields by name, a set of words, or a network of words linked by named relationships, such as is done with a semantic network and from systems that produce a vector of words, attribute labels, a subject matter field labels or decodes, or other names, labels or representative tokens. Further, it does not attempt to "understand" the language of the text in any way other than to measure its information spectrum.

A specific embodiment of a method and apparatus for providing a search engine according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of searching for information comprising the steps of:

segmenting a judgment matrix into a plurality of information sub-matrices where each submatrix has a plurality of classifications and a plurality of terms relevant to each classification;

evaluating a relevance of each term of the plurality of terms with respect to each classification of each information sub-matrix of the information submatrices;

calculating an information spectrum for each of a plurality of documents based upon at least some of the plurality of terms;

receiving a search request;

calculating an information spectrum of the search request based upon at least some of the plurality of terms; and identifying at least some documents of the plurality of documents as relevant to the request based upon a comparison of the calculated information spectrums.

2. The method of searching for information as in claim 1 wherein the step of segmenting a judgment matrix further comprises dividing each information submatrix of the information sub-matrices into a set of columns, where each column is a classification of the information sub-matrix.

3. The method of searching for information as in claim 1 further comprising selecting the plurality of terms based upon a relevancy of each term of the plurality of terms to at least some of the classifications of the information sub-matrices.

4. The method of searching for information as in claim 1 wherein the step of evaluating a relevance further comprises assigning a numerical indicia of relevance having a range of between zero and at least two.

5. The method of searching for information as in claim 4 wherein the step of calculating an information spectrum for each document and for the search request further comprises determining a log average among the numerical indicia of relevance of the terms of each classification.

6. The method of searching for information as in claim 1 wherein the step of identifying at least some documents further comprises determining a Euclidean distance between the information spectrum of the at least some documents and the information spectrum of the search request.

7. The method of searching for information as in claim 1 further comprising selecting a document of the identified documents as definitely relevant to the search request.

8. The method of searching for information as in claim 7 wherein the step of selecting a document of the identified documents as definitely relevant to the search request further comprises calculating an information spectrum of the selected document.

9. The method of searching for information as in claim 8 further comprising using the calculated information spectrum of the selected document as a new search request.

10. The method of searching for information as in claim 1 further comprising zooming in on a portion of a document information spectrum.

11. The method of searching for information as in claim 10 further comprising determining that a document and request have a wide spectra with significant content in a field F of a term.

12. The method of searching for information as in claim 11 further comprising measuring the request and document using a subengine for field F.

13. Apparatus for searching for information comprising:
  means for segmenting a judgment matrix into a plurality of information sub-matrices where each submatrix has a plurality of classifications and a plurality of terms relevant to each classification;
  means for evaluating a relevance of each term of the plurality of terms with respect to each classification of each information sub-matrix of the information sub-matrices;
  means for calculating an information spectrum for each of a plurality of documents based upon at least some of the plurality of terms;
  means for receiving a search request;
  means for calculating an information spectrum of the search request based upon at least some of the plurality of terms; and
  means for identifying at least some documents of the plurality of documents as relevant to the request based upon a comparison of the calculated information spectrums.

14. The apparatus for searching for information as in claim 13 wherein the means for segmenting a judgment matrix further comprises means for dividing each information sub-matrix of the information sub-matrices into a set of columns, where each column is a classification of the information sub-matrix.

15. The apparatus for searching for information as in claim 13 further comprising means for selecting the plurality of terms based upon a relevancy of each term of the plurality of terms to at least some of the classifications of the information sub-matrices.

16. The apparatus for searching for information as in claim 13 wherein the means for evaluating a relevance further comprises means for assigning a numerical indicia of relevance having a range of between zero and at least two.

17. The apparatus for searching for information as in claim 16 wherein the means for calculating an information spectrum for each document and for the search request further comprises means for determining a log average among the numerical indicia of relevance of the terms of each classification.

18. The apparatus for searching for information as in claim 13 wherein the means for identifying at least some documents further comprises means for determining a Euclidean distance between the information spectrum of the at least some documents and the information spectrum of the search request.

19. The apparatus for searching for information as in claim 13 further comprising means for selecting a document of the identified documents as definitely relevant to the search request.

20. The apparatus for searching for information as in claim 19 wherein the means for selecting a document of the identified documents as definitely relevant to the search request further comprises means for calculating an information spectrum of the selected document.

21. The apparatus for searching for information as in claim 20 further comprising means for using the calculated information spectrum of the selected document as a new search request.

22. The apparatus for searching for information as in claim 13 further comprising means for zooming in on a portion of a document information spectrum.

23. The apparatus for searching for information as in claim 22 further comprising means for determining that a document and request have a wide spectra with significant content in a field F of a term.

24. The apparatus for searching for information as in claim 23 further comprising means for measuring the request and document using a subengine for field F.

25. Apparatus for searching for information comprising:
  a first input adapted to segment a judgment matrix into a plurality of information submatrices where each submatrix has a plurality of classifications and a plurality of terms relevant to each classification;
  a second input adapted to evaluate a relevance of each term of the plurality of terms with respect to each classification of each information sub-matrix of the information sub-matrices;
  a first information spectrum calculator adapted to calculate an information spectrum for each of a plurality of documents based upon at least some of the plurality of terms;
  a third input adapted to receive a search request;
  a second information spectrum calculator adapted to calculate an information spectrum of the search request based upon at least some of the plurality of terms; and
  a comparator adapted to identify at least some documents of the plurality of documents as relevant to the request based upon a comparison of the calculated information spectrums.

26. A method of searching for information comprising the steps of:

segmenting a judgment matrix into a plurality of information sub-matrices where each submatrix has a plurality of classifications and a plurality of terms relevant to each classification;

evaluating a relevance of each term of the plurality of terms with respect to each classification of each information sub-matrix of the information submatrices;

calculating an information spectrum for each of a plurality of documents based upon at least some of the plurality of terms;

receiving a search request;

calculating an information spectrum of the search request based upon at least some of the plurality of terms; and identifying at least some documents of the plurality of documents as relevant to the request based upon a comparison of the calculated information spectrums.

27. A method of searching for information comprising the steps of:

segmenting a judgement matrix into a plurality of information sub-matrices;

dividing each information sub-matrix of the information sub-matrices into a set of columns, where each column is a classification of the information submatrix;

selecting a plurality of terms which are relevant to at least some of the classifications of the information sub-matrices;

evaluating a relevance of each term of the plurality of terms with respect to each column of each information sub-matrix of the information sub-matrices;

calculating an information spectrum for each of a plurality of documents based upon at least some of the plurality of terms;

receiving a search request;

calculating an information spectrum of the search request based upon at least some of the plurality of terms; and identifying at least some documents of the plurality of documents as relevant to the request based upon a comparison of the calculated information spectrums.

28. A method of searching for information comprising the steps of:

segmenting a judgment matrix into a plurality of subject matter matrices;

dividing each subject matter matrix of the subject matter matrices into a set of classifications;

selecting a plurality of terms which are relevant to at least some of the classifications of the subject matter matrices;

evaluating a relevance of each term of the plurality of terms with respect to each classification of each subject matter matrix;

calculating an information spectrum for each of a plurality of documents based upon at least some of the plurality of terms;

receiving a search request;

calculating an information spectrum of the search request based upon at least some of the plurality of terms; and identifying at least some documents of the plurality of documents as relevant to the request based upon a comparison of the calculated information spectrums.

* * * * *